United States Patent
Chang

(10) Patent No.: US 7,800,709 B2
(45) Date of Patent: Sep. 21, 2010

(54) PRISM SHEET AND LIQUID CRYSTAL DISPLAY DEVICE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 121 days.

(21) Appl. No.: 11/957,489

(22) Filed: Dec. 17, 2007

(65) Prior Publication Data

US 2009/0079906 A1 Mar. 26, 2009

(30) Foreign Application Priority Data

Sep. 21, 2007 (CN) .................. 2007 1 0201803

(51) Int. Cl.
*G02F 1/1335* (2006.01)

(52) U.S. Cl. .................. 349/64; 362/246; 362/337; 359/831; 359/837

(58) Field of Classification Search ............... 349/64; 362/246, 337; 359/831, 837
See application file for complete search history.

(56) References Cited

U.S. PATENT DOCUMENTS

| 7,154,572 | B2 * | 12/2006 | Lee et al. ............... 349/61 |
| 2007/0002471 | A1 * | 1/2007 | Tang ................... 359/831 |
| 2009/0128738 | A1 * | 5/2009 | Matsumoto et al. ...... 349/64 |

FOREIGN PATENT DOCUMENTS

JP 2003337331 A 11/2003

* cited by examiner

*Primary Examiner*—Richard H Kim
(74) *Attorney, Agent, or Firm*—Frank R. Niranjan

(57) ABSTRACT

An exemplary prism sheet according to a preferred embodiment includes a transparent main body. The transparent main body includes a light input surface and a light emitting surface opposite to the light input surface. A plurality of curved elongated V-shaped protrusions are formed on the light emitting surface. Each of the curved elongated V-shaped protrusions extends along a circular arc. The circular arcs have a same curvature, and centers of the circular arcs are aligned apart and in a straight line. A liquid crystal display device using the prism sheet is also provided.

5 Claims, 6 Drawing Sheets

PRISM SHEET AND LIQUID CRYSTAL DISPLAY DEVICE USING THE SAME

CROSS-REFERENCE TO RELATED APPLICATIONS

This application is related to eight co-pending U.S. patent applications, which are: application Ser. No. 11/933,439 and Ser. No. 11/933,441, filed on Nov. 1, 2007, and both entitled "PRISM SHEET AND LIQUID CRYSTAL DISPLAY DEVICE USING THE SAME", application Ser. No. 11/946,860 and Ser. No. 11/946,862, filed on Nov. 29, 2007, and both entitled "PRISM SHEET AND LIQUID CRYSTAL DISPLAY DEVICE USING THE SAME", application Ser. No. 11/949,056, filed on Dec. 3, 2007, and entitled "PRISM SHEET AND LIQUID CRYSTAL DISPLAY DEVICE USING THE SAME", application Ser. No. 11/949,057, filed on Dec. 3, 2007, entitled "PRISM SHEET AND BACKLIGHT MODULE USING THE SAME", application Ser. No. 11/957,491, and entitled "PRISM SHEET AND BACKLIGHT MODULE USING THE SAME", and application Ser. No. 11/957,490, and entitled "PRISM SHEET AND LIQUID CRYSTAL DISPLAY DEVICE USING THE SAME". In all these co-pending applications, the inventor is Shao-Han Chang. All of the co-pending applications have the same assignee as the present application. The disclosures of the above identified applications are incorporated herein by reference.

BACKGROUND OF THE INVENTION

1. Field of the Invention

The present invention generally relates to optical plates, and more particularly to a prism sheet for use in, for example, a liquid crystal display device.

2. Discussion of the Related Art

FIG. 3 represents a typical liquid crystal display (LCD) device 10. The LCD device 10 includes a backlight module 11 and an LCD panel 12 disposed above the backlight module 11. The backlight module 11 includes a housing 111 and a plurality of lamps 112 for emitting light disposed above a base of the housing 111. The backlight module 11 further includes a light diffusion plate 113 and a prism sheet 114 stacked on the top of the housing 111 in that order. An interior of the housing 111 is configured for reflecting light from the lamps 112 towards the light diffusion plate 113. The light diffusion plate 113 includes a plurality of dispersion particles. The dispersion particles are configured for scattering light, and thereby enhancing the uniformity of the received light emitting from the light diffusion plate 113.

Referring to FIG. 4, the prism sheet 114 includes a transparent base 1141 and a plurality of V-shaped elongated protrusion 1142 formed on the transparent base 1141. Each V-shaped elongated protrusion 1142 extends along a direction parallel to one edge of the prism sheet 114. The plurality of V-shaped protrusions 1142 are regularly and periodically arranged parallel to each other. In use, light emitted from the lamps 112 enters the prism sheet 114 after being scattered in the diffusion plate 113. The light is refracted by the V-shaped protrusions 1142 of the prism sheet 114 and is thereby concentrated, so that a brightness of light illumination is increased. Finally, the light propagates into the LCD panel 12 disposed above the prism sheet 114.

However, it is prone to occur moire pattern interference on the LCD panel 15 due to the V-shaped structures 102 being aligned with the LCD pixels. Referring to FIG. 5, in order to decrease the moire pattern interference, another typical prism sheet 20 is provided. The prism sheet 20 includes a transparent base 201 and a plurality of V-shaped protrusion 202 formed on the transparent base 201. Each V-shaped protrusion 202 extends along an irregular curve line. The V-shaped protrusions 202 have a same curvature at a corresponding portion. Since each of the V-shaped protrusion 202 extends along the irregular curve line, the V-shaped protrusions 202 are aligned obliquely with the LCD pixels, and thus the moire pattern interference will be not occurred.

Furthermore, it is difficult to manufacture the prism sheet 20 by injection molding method, because it is difficult to prepare a mold having a surface defining a plurality of curved V-shaped depressions according to the V-shaped protrusions 202. Typically, in a cutting process of making the mold, a cutter having V-shaped blade is driven along different directions according to a predetermined pattern. In other words, the cutter should be driven encircle related to different points according to the curvatures of the V-shaped depression of the predetermined pattern. Because the curved V-shaped depressions of the surface of the mold are very small in size, it is costs time to form the curved V-shaped depressions in the surface of the mold. In addition, it is difficult to keep the precision of the curved V-shaped depression. Therefore, design and manufacturing costs of the mold is increased, and the prism sheet 20 may have a low optical performance.

What is needed, therefore, is a new prism sheet and a liquid crystal display device using the prism sheet that can overcome the above-mentioned shortcomings.

SUMMARY

A prism sheet according to a preferred embodiment includes a transparent main body. The transparent main body includes a light input surface and a light emitting surface opposite to the light input surface. A plurality of curved elongated V-shaped protrusions are formed on the light emitting surface. Each of the curved elongated V-shaped protrusions extends along a circular arc. The circular arcs have a same curvature, and centers of the circular arcs are aligned apart and in a straight line.

A liquid crystal display device according to a preferred embodiment includes a backlight module and a liquid crystal display panel disposed above the backlight module. The backlight module includes a light source, a light diffusion plate, and a prism sheet. The light diffusion plate is disposed above the light source. The same prism sheet as described in the previous paragraph is employed in this embodiment. The prism sheet is disposed above the light diffusion plate.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present prism sheet and liquid crystal display device. Moreover, in the drawings, like reference numerals designate corresponding parts throughout several views, and all the views are schematic.

DETAILED DESCRIPTION OF THE EMBODIMENTS

Reference will now be made to the drawings to describe a preferred embodiment of the present prism sheet and liquid crystal display device, in detail.

Figure 1:
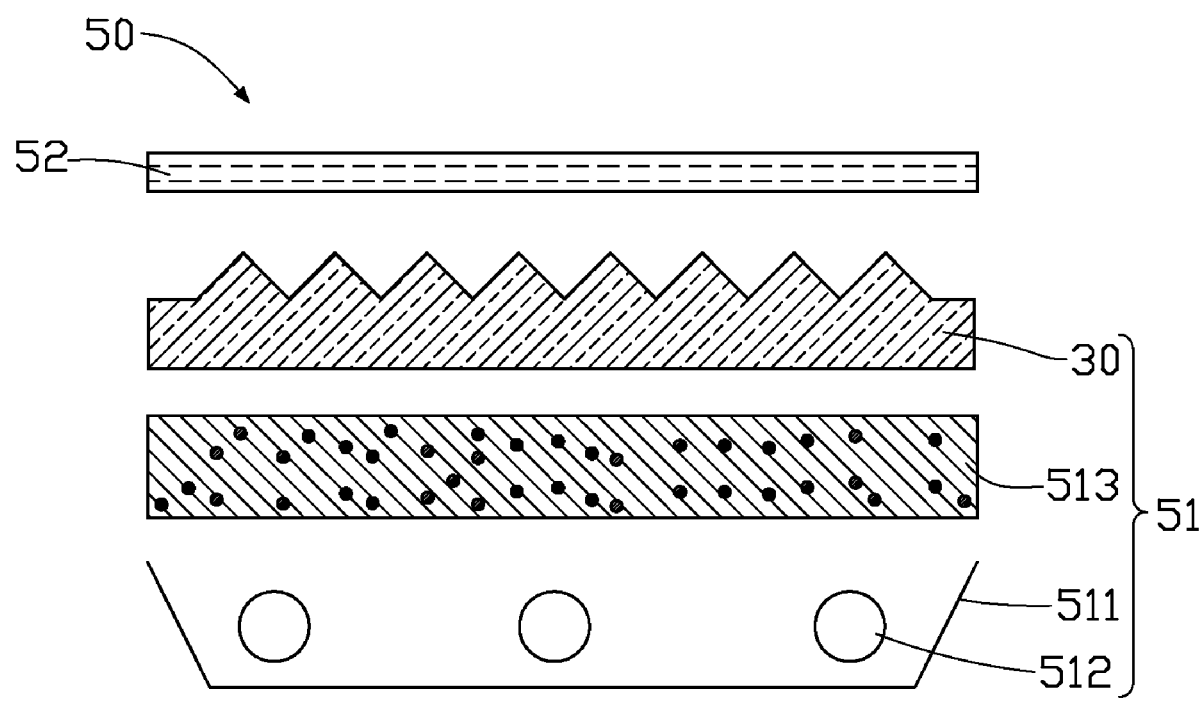
FIG. 1 is an exploded, side cross-sectional view of a liquid crystal display device according to a preferred embodiment of the present invention.

Referring to FIG. 1, a liquid crystal display device 50 according to a preferred embodiment of the present invention is shown. The liquid crystal display device 50 includes a backlight module 51 and a liquid crystal display panel 52 disposed above the backlight module 51. The backlight module 51 includes a housing 511 and a plurality of lamps 512 for emitting light disposed above a base of the housing 511. The backlight module 51 further includes a light diffusion plate 513 and a prism sheet 30 stacked on the housing 511 in that order. An interior of the housing 511 is configured for reflecting light towards the light diffusion plate 513. The light diffusion plate is configured for scattering light.

Figure 2:
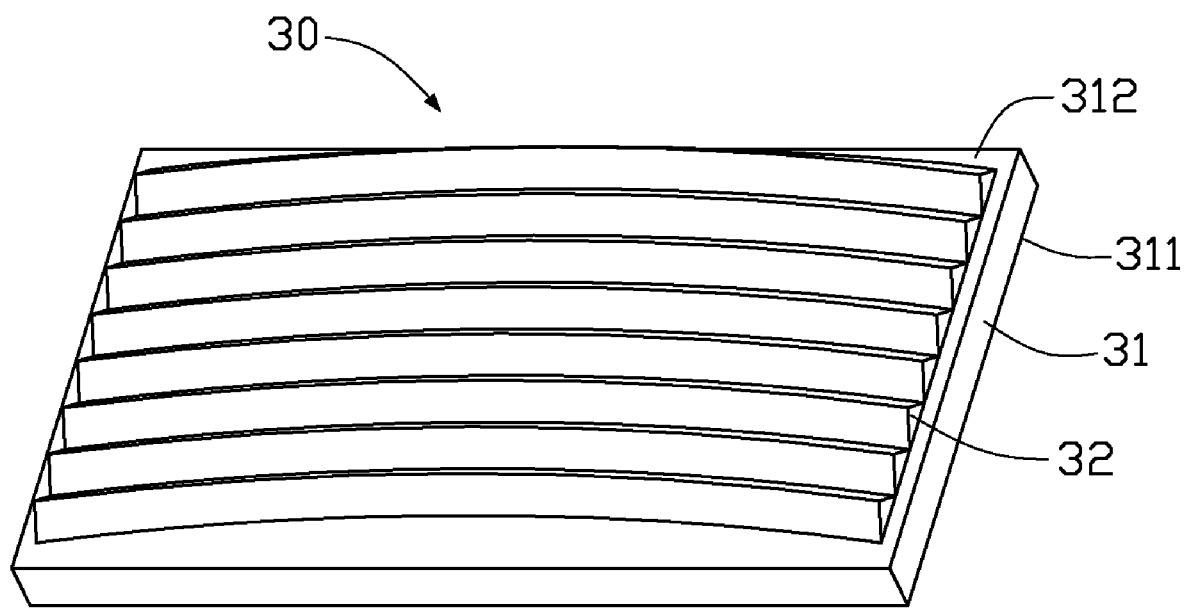
FIG. 2 is an isometric view of a prism sheet of the liquid crystal display device of FIG. 1.
Figure 3:
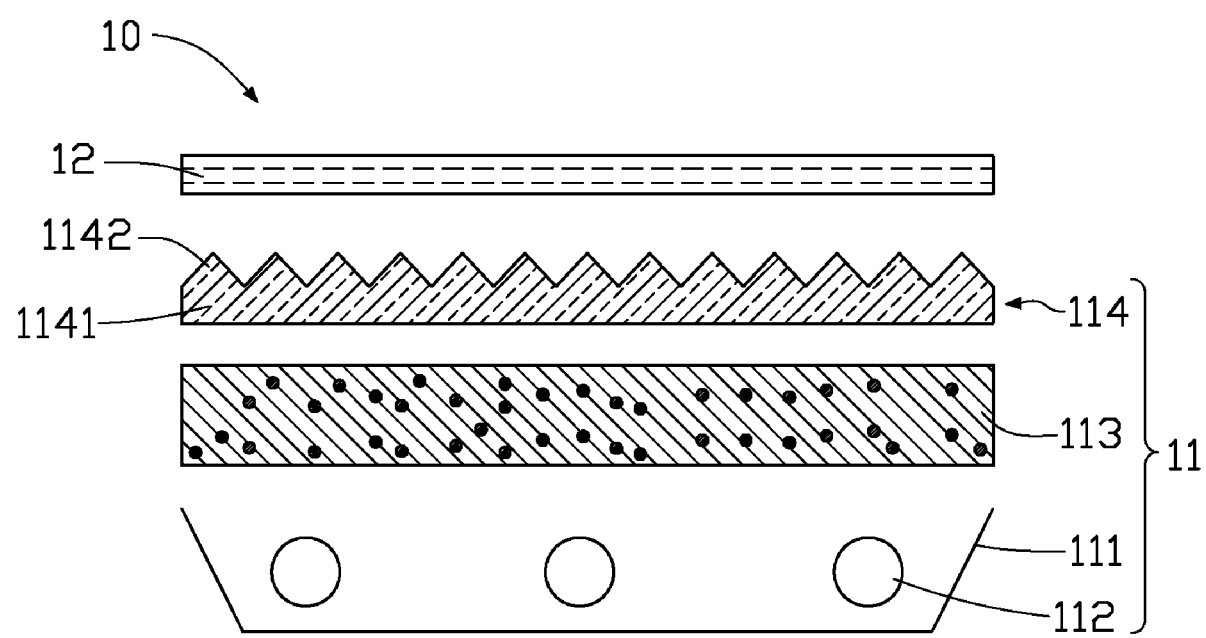
FIG. 3 is an exploded, side cross-sectional view of a conventional liquid crystal display device.
Figure 4:
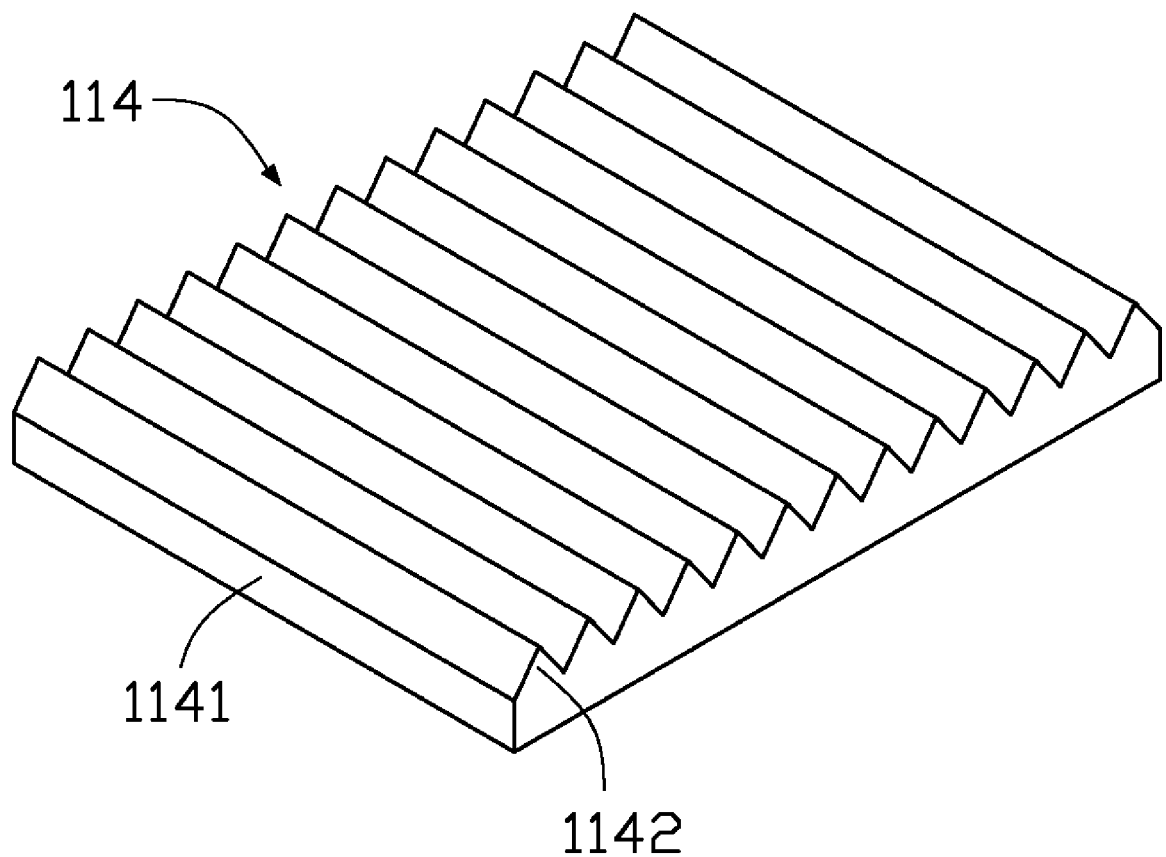
FIG. 4 is an isometric view of a prism sheet of the liquid crystal display device of FIG. 3.
Figure 5:
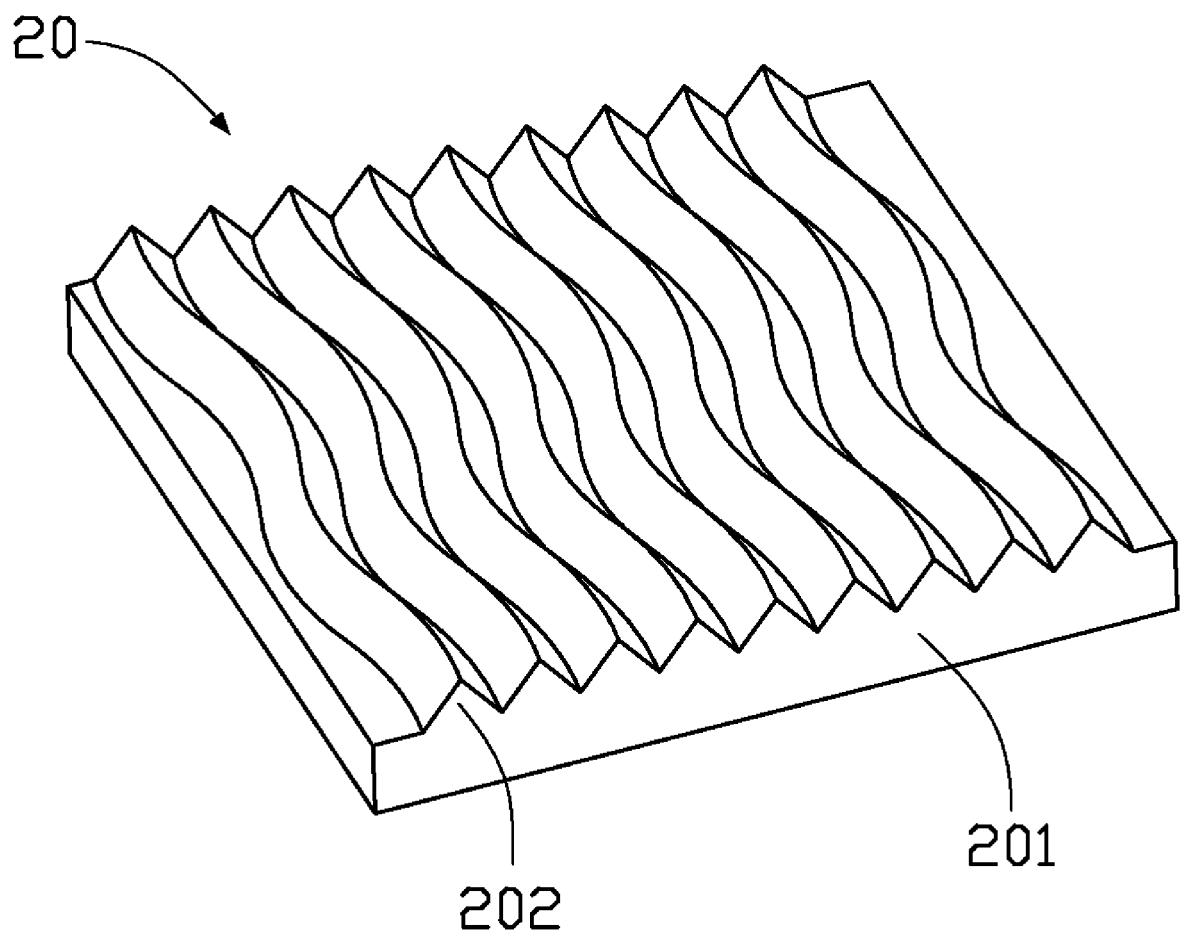
FIG. 5 is an isometric view of another conventional prism sheet.
Figure 6:
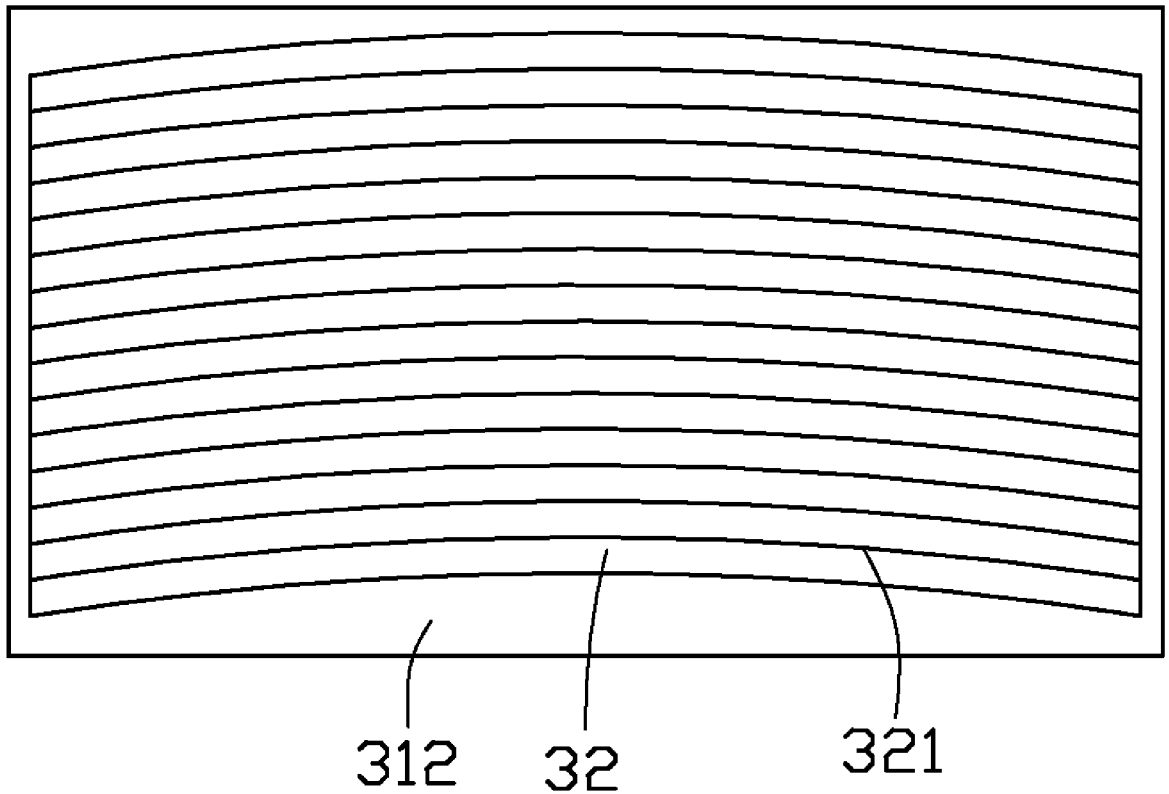
FIG. 6 is a top plan view of the prism sheet of FIG. 1.

Referring to FIG. 2, the prism sheet 30 includes a transparent main body 31. The main body 31 includes a light input surface 311 and a light emitting surface 312. The light emitting surface 312 and the light input surface 311 are on opposite sides of the main body 31. A plurality of curved elongated V-shaped protrusions 32 are formed on the light emitting surface 312. Each curved elongated V-shaped protrusion 32 extends along a circular arc 321 (see FIG. 6) between a pair of opposite side surfaces of the prism sheet 30. The circular arcs 321 are aligned in the light emitting surface 312 (the circular arcs 321 are overlapped with ridges of the V-shaped protrusion 32 in FIG. 6) and have a same curvature, and centers of the circular arcs 321 are aligned apart and in a straight line. A vertex angle of each of the curved elongated V-shaped protrusions 32 can be in a range from about 60 degrees to about 120 degrees. A pitch between adjacent curved elongated V-shaped protrusions 32 can be in a range from about 0.025 millimeters to about 1 millimeter.

The prism sheet 30 can be integrally formed by injection molding technology. A thickness of the prism sheet 30 can be in a range from about 0.5 millimeters to about 3 millimeters. The prism sheet 30 is made of material selected from the group consisting of polycarbonate, polymethyl methacrylate, polystyrene, copolymer of methyl methacrylate and styrene and any combination thereof.

The prism sheet 30 is integrally formed by an injection molding method. A mold having a molding surface defining a plurality of curved elongated V-shaped depressions is provided. Because the curved elongated V-shaped protrusions 32 have the same curvature, the curved elongated V-shaped depressions should be etched by a cutter that moves along the circular arcs having the same curvature. The cutter moves along the circular arc to produce a single curved elongated V-shaped depression, thus, not need to encircle different points with different radius in a process of making one curved elongated V-shaped depression. When compared with a mold for molding a conventional prism sheet that has a plurality of V-shaped protrusions extending along an irregular curve line, the mold for molding the prism sheet 30 is easy to be made by the cutter, thereby, lowering the manufacturing cost of the mold. Also, because each curved elongated V-shaped depressions on the molding surface is etched by driving the cutter encircling one point with the same radius, the surface of the curved elongated V-shaped depression is smooth. Therefore, the surface of the curved elongated V-shaped protrusion 32, of the prism sheet 30, is smooth.

Moreover, in comparison with the conventional prism sheet, because the prism sheet 30 is integrally formed by injection molding, the prism sheet 30 is easier to mass-produce. Furthermore, unlike the conventional prism sheet that is solidified by UV-cured transparent melted resin, the prism sheet 30 has better rigidity and mechanical strength, and is not prone to damage or scratch.

Referring to FIG. 1 again, light from the light sources 512 enters the diffusion plate 513 and becomes scattered. Scattered light then exits the diffusion sheet to the prism sheet 30. Since the curved elongated V-shaped protrusions 32 extend along the circular arcs, an arrangement of the curved elongated V-shaped protrusions 32 is different from that of pixels of the liquid crystal display panel 52. Thus moire pattern interference between the prism sheet 30 and the pixel pitch of the liquid crystal display panel 52 is reduced or even eliminated.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A liquid crystal display device comprising:
   a backlight module having:
   a light source;
   a light diffusion plate disposed above the light source;
   a prism sheet disposed above the light diffusion plate, the prism sheet having:
      a light input surface;
      a light emitting surface opposite to the light input surface; and
      a plurality of curved elongated V-shaped protrusions protruded from the light emitting surface, wherein each of the curved elongated V-shaped protrusions extends along only one circular arc having a constant radius and two ends adjacent to opposite side surfaces of the main body respectively; the circular arcs are aligned in the light emitting surface and centers of the circular arcs are aligned apart and in a straight line; and
   a liquid crystal display panel disposed above the prism sheet.

2. The liquid crystal display device as claimed in claim 1, wherein a vertex angle of each of the curved elongated V-shaped protrusions is in a range from about 60 degrees to about 120 degrees.

3. The liquid crystal display device as claimed in claim 1, wherein a pitch between adjacent curved elongated V-shaped protrusions is in a range from about 0.025 millimeters to about 1 millimeter.

4. The liquid crystal display device as claimed in claim 1, wherein the prism sheet is made of material selected from the group consisting of polycarbonate, polymethyl methacrylate, polystyrene, copolymer of methyl methacrylate and styrene, and any combination thereof.

5. The liquid crystal display device as claimed in claim 1, wherein a thickness of the prism sheet is in a range from about 0.5 millimeters to about 3 millimeters.

* * * * *